United States Patent [19]
Boss

[11] 3,868,246

[45] Feb. 25, 1975

[54] PELLET PRODUCTION PROCESS

[75] Inventor: Karl Heinz Boss, Bad Homburg, Germany

[73] Assignee: Dravo Corporation, Pittsburgh, Pa.

[22] Filed: Oct. 5, 1973

[21] Appl. No.: 403,919

Related U.S. Application Data

[63] Continuation-in-part of Ser. No. 165,284, July 22, 1971, abandoned.

[52] U.S. Cl................................ 75/3, 34/33, 34/38, 75/5
[51] Int. Cl........................... F26b 3/22, C21b 1/02
[58] Field of Search........................... 75/3–5; 34/38, 34/DIG. 15, 236, 33

[56] References Cited
UNITED STATES PATENTS 2,750,272   6/1956   Lellep...................................... 75/3
2,862,807  12/1958   Erck et al................................ 75/5
3,333,951   8/1967   Ban......................................... 75/3

*Primary Examiner*—Allen B. Curtis
*Attorney, Agent, or Firm*—Parmelee, Miller, Welsh & Kratz

[57] ABSTRACT

A method is detailed in which stronger pellets or oxidic iron ores are produced, which are less susceptible to abrasion and breakage. In the present process, only a predetermined portion of the green pellet charge to be treated is initially disposed on a traveling grate, with this initial charge being dried. Thereafter, the remaining portion of the total of green pellets charge is added to the dried charge portion upon the traveling grate, and the total charge is then dried and calcined to produce the resultant stronger particle pellets.

6 Claims, 1 Drawing Figure

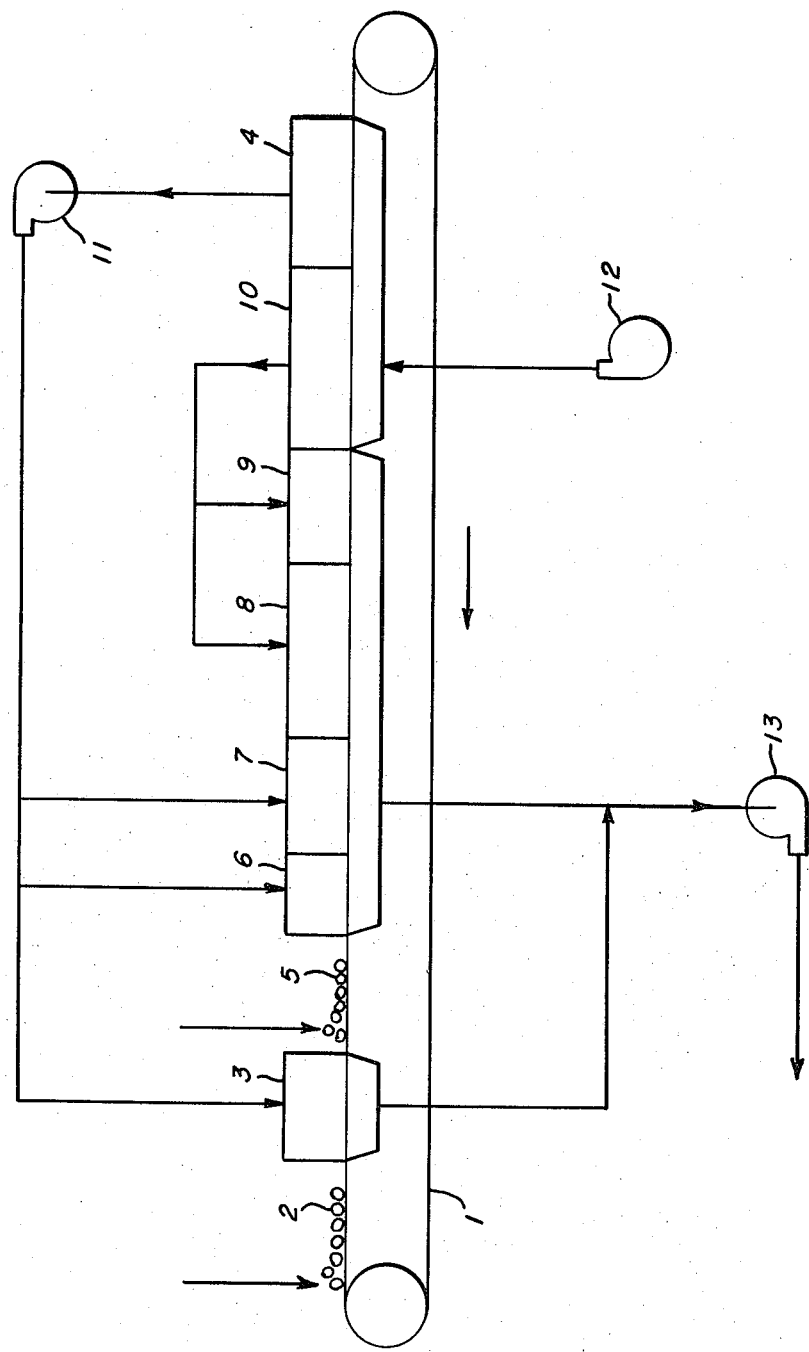

PELLET PRODUCTION PROCESS

BACKGROUND OF THE INVENTION

This application is a continuation-in-part of application Ser. No. 165,284, filed July 22, 1971, now abandoned, and relates to a process for the production of solid pellets from fine-grained materials, especially oxidic iron ores.

Many fine-grained materials, such as ore primarily and iron ores specifically, are prepared according to known processes for further processing by pelletizing of the material, if necessary after a concentration, for example, by floatation, magnetic separation, or a settling-floating process. As is known, pelletizing consists in making fine-grained moistened materials lumpy by a rolling process on inclined rotary faces, for example in a granulating drum or on a pelletizing plate. The approximately spherical agglomerates which are obtained in this way are finally hardened by heat treatment, for example on a traveling grate.

Numerous processes are known in the art which involve an as extensive a use as possible of the heat content of the generally employed hot gases, or else an optimum heat balance burning process by providing a suitable composition for the green pellets. (German Patent No. 1,433,339; K. Meyer, Stahl and Eisen 82, 1962, page 147; G. Von Struve, et al. Aufbereitungstechnik 7, 1966, page 355; K. Meyer, H. Rausch, Journel of Metals, February, 1953, page 129.)

In addition to problems which are directly related to the heat balance of the burning process, or relating to the protection of the burning apparatus, for example anti-rust coatings and protective materials for the sides, the drying of the green pellets presents a special problem. As is known, the green pellets which come directly to the pelletizing process have a low compressive strength which makes further treatment necessary either during transport or in the dry stage. Difficulties occur during drying of the charge due to the fact that moisture from one location on the traveling grate condenses on the adjacent pellet surfaces on another portion of the traveling grate, and there increases the total moisture of the pellets in such a way that deformation occurs, which can lead to crumbling. The disadvantage is particularly applicable to suction-type drying in which heating gases are pulled from above the pellet charge to below the supporting grate, because the moisture condenses on the lower pellets, which are the ones which bear a greater load due to the higher piling of material. With a standard charge height of 30 to 40 centimeters, approximately 10 to 30 percent of the pellets, primarily in the lower layers are deformed. As a result, the corresponding calcined material leaves the process in a form which is not perfectly hardened and must be reprocessed. A still greater disadvantage than the occurrence of abrasion and pellet breakage is the poor gas permeability of the resultant pellets, which causes irregular burning and an increased dust content in the waste gases.

The proportion of scrap and other defects can, of course, be reduced by calcining a lesser charge height. This will, of course, result in a reduction of efficiency of the calcing apparatus which has a preestablished grate area.

Another known method of drying the traveling grate charge is by passing hot gases from below upward, i.e. pressure drying as disclosed, for example, in U.S. Pat. Nos. 3,172,754 and 3,332,770. Such drying, of course, avoids the previously mentioned disadvantages, since the condensation of moisture takes place on the upper, and thus less heavily loaded pellet layers.

U.S. Pat. No. 3,172,754, at column 4, line 57 et seq., describes the condensation of moisture in the lower part of the pellet bed where downdraft drying is employed, and further explains that this disadvantage is overcome by subjecting the pellets to updraft drying. At column 5, line 14, et seq., it is further pointed out that because of condensation of moisture on the pellets in the upper part of the bed due to the employment of updraft drying, there is provided a downdraft drying zone immediately following the updraft drying zone. Thus the entire pellet charge passes through an updraft drying stage followed by a downdraft drying stage before the pellets enter the high temperature preheating and firing zones.

Drying has the great disadvantage that significant amount of dust and odors are produced as a result of leakage between the drying hood and the traveling grate which always occurs. In order to effect proper heat transfer from the higher temperature gases used in pressure drying to the charge, much larger blowers or a large number of blowers are required, in contrast to such drying.

SUMMARY OF THE INVENTION

The difficulties recited above are eliminated by the present invention, but the advantages of the described process principles are retained. Furthermore, the present invention avoids preliminary heating of the grate due to updraft drying, thus the grate remains relatively cooler for a longer distance of travel. In additiona, a substantial amount of equipment is eliminated in the present invention as compared to that needed in U.S. Pat. Nos. 3,172,754 and 3,332,770. The invention relates to a process for the production of solid pellets from fine-grained materials, particularly oxidic iron ores, by forming green pellets, and thereafter drying the charge by the suction or downdraft process and calcining of the charge on a traveling grate. The process is characterized by the fact that the green pellets are discharged within the drying zone at at least two places which are in sequence of travel of the traveling grate.

More particularly, the invention provides a method of heat indurating green pellets in a traveling grate which comprises depositing a predetermined portion of a total charge of green pellets on the receiving end of a traveling grate and moving them through a first downdraft drying zone where heated gases are passed downwardly through the pellet bed. An additional portion of the green pellet charge is then deposited on top of the first-dried portion and the entire bed is passed through a second downdraft drying zone wherein heated gases are passed downwardly through the bed before the first-dried portion of pellets have cooled to the level of the dew point of the moistureladen gases that have contacted the pellets last deposited on the bed.

In carrying out the process, a portion of the total charge of green pellets is supplied to the traveling grate by means of standard discharge apparatus, such as roller conveyors, belt conveyors, or a combination of both. This predetermined portion of the charge passes through a first stage of suction drying with heating gases passed through the pellet charge from above, in which a considerable reduction of moisture takes place. Because of the relatively slight layer thickness, there is practically no condensation. After the dried portion of the green pellet charge passes the first drying stage, preferably the remainder of the total green pellet charge is added to it and is superimposed atop the already dried portion, upon the traveling grate, by means of a second discharge apparatus. The total charge upon the traveling grate is then advanced to the second drying stage. Here the moisture is removed from the charge which was introduced later. The condensation of moisture on the portion of the charge which was already dried does not occur, since its temperature from the first drying stage is above the dew point of the gases which are evolved from the later added charge material.

The division of the charge preferably takes place in such a way that one-third to two-thirds of the pellet charge is applied to the traveling grate at the first discharge point. The rest of the charge is applied by a second charging apparatus which is spaced far enough beyond the first drying stage that a drying time of 2 to 4 minutes is available for that portion of the charge initially disposed upon the traveling grate. In a preferred embodiment, hot gases with a temperature of 200° to 350° C. are used in both drying zones.

Such a two-stage drying of the pellet charges is usually sufficient. In special situations, for example where a very high total charge is provided, the pellets may be discharged onto the traveling grate at three distinct places along its length in the direction of travel of the grate. In such cases the cost of the third discharge apparatus must be weighed against the advantages which can be obtained.

It is to be understood that the pellet calcining process includes other standard measures. Thus, hearth layers, and protective material for the sides can be added for the protection of the traveling grate. The pellets can be hardened on a traveling grate which passes through heating, calcining, secondary calcining, and several cooling zones. Heat cooling can be affected by directing cooling gases upward from below the traveling grate, with the waste gases of the first cooling zone directly introduced to the heating, calcining, and secondary calcining zones without the use of a blower. The waste gas from the second cooling zone can be used for the drying of the pellets according to the invention.

BRIEF DESCRIPTION OF THE DRAWING

The sole FIGURE is a schematic representation of the apparatus by which the process of the present invention can be carried out, and which can be referred to for a better understanding of the invention.

DESCRIPTION OF THE PREFERRED EMBODIMENT

In the drawings, as here shown, there is a first downdraft drying hood 3 over the traveling grate 1 followed by an open area 5 and then a second downdraft drying hood 6 which is followed by a downdraft preheating hood 7, then downdraft firing hoods 8 and 9, with updraft cooling hoods 10 and 4, cooling hood 4 being at the coolest end of the grate before the grate reaches the discharge end of the upper reach of the traveling grate.

More specifically, traveling grate 1 of the represented pellet calcining machine is moved in the direction of the arrow through the drying, the calcining, and cooling zones. At 2, a first layer of a predetermined portion of the green pellets is applied by means of a discharge apparatus (not shown). The predetermined portion of the green pellet charge passes through the first drying stage 3 in which the pellets are dried by a suction process, by means of heated gases which are cycled from the second cooling zone 4. After the dried, predetermined portion of green pellets advances to the drying stage, a second charging of green pellets takes place at 5, this can be the remaining portion of green pellets charged. From there the total charge advances to the second drying stage 6 in which the pellet layer which was applied at point 5 is dried. After the charge passes through the second drying stage at 6, the charge passes into the heating zone 7, the calcining zone 8, the secondary calcining zone 9, the first cooling stage 10, and the second cooling stage 4, as is well known in the art. The blowers 11, 12 and 13 are used to produce the gas flow which is indicated by arrows in the FIGURE.

Example A study has been made comparing the pellets produced by the process described above with pellets produced in a standard single step drying process. A laboratory calcining tray, charged with conventionally prepared pellets of magnetite iron ore with a 10 to 15 millimeter diameter, served as a drying and calcining unit. The total charge height was 30 centimeters, with the pellet charge introduced in one case as a whole, and in the other case in two stages with a 15 centimeter charge height added in two stages. In both cases, drying took place first for 2 minutes using hot gases at approximately 250°C. with a pressure differential of 200 millimeters, water gauge pressure sustained across the charge. In the example where the total charge was added to a height of 30 centimeters, heating at a calcining temperature of 1320°C. was immediately carried out after the drying stage. In the second example the initial charge which was 15 centimeters in height was dried, and thereafter an additional 15 centimeter charge height was added on top, with the drying of the second charge of green pellets then taking place. The calcining in this second example took place immediately after the drying of the second charge. The total period until the maximum calcining temperature was reached was 7 minutes in each case.

The results which were obtained are compared in the following table:

| Type of discharge | Abrasion −5mm | −0.6mm | Portion of Deformed Pellets |
|---|---|---|---|
| double | 2.6 | 2.4 | 5% |
| Single | 3.2 | 2.8 | 20 − 25% |

By way of explanation of the table presented, the type of discharge listed as double or single refers respectively to whether only a portion of the charge was dried, and then the remainder of the charge added and dried, or whether the entire charge was added at one time and dried. A standard test for comparing the strength of pellets is to conduct an abrasion test in which the pellets are subjected to rolling in a standard apparatus and where the percentage of material which has broken off the pellets has a particle size less than 5 millimeters, and less than 0.6 millimeters in diameter. It can be readily appreciated that less material is abraded from the pellets produced by double charge, double drying process.

The portion of deformed pellets was determined in such a way that the pellets which had cracked as a result of deformation were counted. It is clear that cracked pellets lead to strong abrasion and pellet breakage in subsequent usage of the pellets, for example in a blast furnace. The through-put of pellets prepared according to the invention is about 31.2 tons per day per square meter, and only 24.0 tons per day per square meter for pellets produced by the prior art processes.

What is claimed is:

1. In the method of heat indurating green pellets comprising the steps of depositing green pellets on a traveling grate and thereafter drying, calcining and cooling said pellets, an improved drying method comprising:
   a. depositing a predetermined portion of a total charge of green pellets on the receiving end of a traveling grate;
   b. moving said pellets through a first downdraft drying zone wherein heated gases are passed downwardly through the pellets, said heated gases being at a sufficient temperature to drive-off entrained moisture from said pellets but at a temperature insufficient to calcine said pellets;
   c. depositing additional green pellets on top of the first-dried pellets; and
   d. subjecting the bed to a downdraft flow of heated gases at the said temperature before the first-dried pellets have cooled to the level of the dew point of the moisture-laden gases that have contacted the pellets last deposited on the bed.

2. The improvement of claim 1 wherein said additional green pellets comprise the remainder of the total charge following depositing of the predetermined portion.

3. The improvement of claim 1 wherein the predetermined portion of green pellets comprises from one-half to two-thirds of the total charge.

4. The improvement of claim 1 wherein the temperature of the heated gases are from about 200°C. to about 350°C.

5. The improvement of claim 1 wherein the predetermined portion of green pellets is dried for a period from about 2 to 4 minutes.

6. The improvement of claim 1 wherein the heated gases are derived from the second of two cooling zones through which the traveling grate passes following calcining of the pellets.

* * * * *